E. L. WILLIAMS.
SHOCK ABSORBER.
APPLICATION FILED MAR. 3, 1914.
1,121,315.
Patented Dec. 15, 1914.
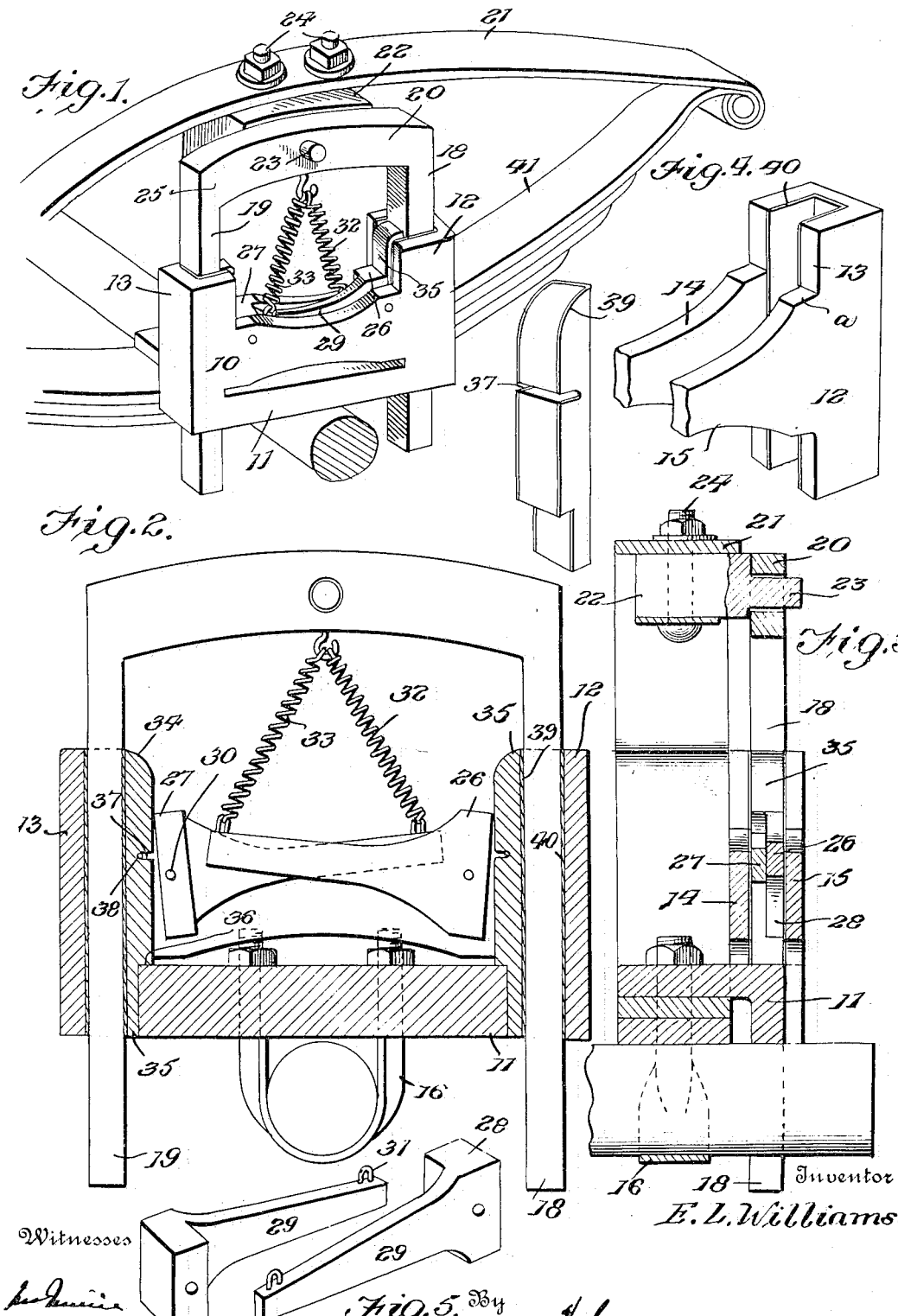

UNITED STATES PATENT OFFICE.

ERNEST L. WILLIAMS, OF HOPLAND, CALIFORNIA.

SHOCK-ABSORBER.

1,121,315.  Specification of Letters Patent.  Patented Dec. 15, 1914.

Application filed March 3, 1914. Serial No. 822,144.

*To all whom it may concern:*

Be it known that I, ERNEST L. WILLIAMS, citizen of the United States, residing at Hopland, in the county of Mendocino and State of California, have invented certain new and useful Improvements in Shock-Absorbers, of which the following is a specification.

The present invention relates to new and useful improvements in shock absorbers, and has particular reference to that type which are designed particularly for use in connection with automobile springs.

The principal object of the invention is to provide a shock absorber which may be so applied to the spring of an automobile that it will insure the gradual return of the spring to its normal position, deadening its rebound and after-movements by absorbing them through the agency of a frictional resistance.

As is well known the only type of shock absorber which is really efficient is one which, while permitting the springs to compress freely and without material resistance, will act to prevent the sudden re-action of the springs.

A further object of my invention is, therefore, to construct my shock absorber with such regard to the relative arrangement of parts and the manner in which they are connected to the relatively movable vehicle parts that little or no resistance will be offered the springs in their compression, while a considerable frictional resistance will be automatically produced to prevent the sudden re-action or expansion of the springs.

The above and additional objects are accomplished by such means as are illustrated in the accompanying drawings, described in the following specification, and then more particularly pointed out in the claims which are appended hereto and form a part of this application.

Referring to the drawings, wherein there has been illustrated the preferred embodiment of this invention as it is reduced to practice, and throughout the several views of which similar reference numerals designate corresponding parts, Figure 1 is a perspective view showing the shock absorber in operative assembled position on a vehicle spring; Fig. 2 is a vertical section taken through the approximate center of the device; Fig. 3 is a vertical section taken medially through Fig. 2; Fig. 4 is a perspective view illustrating in detail one of the brake shoes and the channel-shaped guide in which one of the movable elements of the absorber is slidably mounted; and Fig. 5 is a perspective view of the co-acting levers which are employed in applying the brake shoes when the spring is expanding or re-acting.

As shown in Fig. 1, the preferred embodiment of the invention includes a body member, a substantially U-shaped brake yoke, the arms of which are mounted for sliding movement in guideways formed in the body member, and a pair of levers which are yieldably connected to the brake yoke and are adapted upon the separation of the yoke and body member to automatically apply a pair of pivoted brake shoes against the arms of the yoke for offering a frictional resistance to the separation of the yoke and body member.

The body member, designated by the numeral 10, is preferably an iron casting which includes a base plate 11, a pair of channel-shaped guides 12 and 13 rising from opposite ends thereof, and a pair of parallel spaced webs or plates 14 and 15, which serve not only to rigidly connect the guides, but also act as guards whereby the brake shoes and the actuating levers of the brake shoes are protected against injury through contact with rocks or other foreign obstacles which may be thrown by the wheels.

The base plate 11 is, in the preferred embodiment of the invention, square in shape, and is formed with a pair of spaced apertures or openings through which may be inserted the arms of a U-bolt 16, which, as best shown in Fig. 2, is employed in attaching the body member of the device to the axle of the automobile. The channels which are defined by the guide members 12 and 13 extend through the base plate 11 as shown in Fig. 2, so that the arms 18 and 19 of the U-shaped brake yoke 20 may be normally extended through the member 11, thus preventing any accidental disconnecting of the body member 10 and brake yoke 20, when the vehicle spring is subjected to a shock of unusual severity. It has been found preferable to pivotally connect the brake yoke 20 to the upper spring member 21, and for this reason, therefore, I have provided an attaching block 22, extending laterally from which is a pivot pin or stud 23.

In applying the shock absorber to the vehicle spring the block member 22 is first secured to the member 21 by means of U-bolts, indicated at 24, and the pivot pin or stud is then inserted through an aperture which is formed centrally in the bight portion 25 of the brake yoke.

Between the plate members 14 and 15 of the body member are pivoted the brake shoe levers 26 and 27. These members 26 and 27 are formed from metallic bars of suitable length and each consists in a substantially square head member 28 and a relatively thin arm 29 extending laterally from the head and offset with respect to the center line thereof. The arms 29 of the levers are oppositely offset so that they may be mated when they are assembled and positioned between the plates 14 and 15. The head portions 28 of the brake levers are pivoted on pins 30, which extend laterally between the plate members 14 and 15 adjacent the terminals thereof. The terminal of each of the arms 29 is provided with an eyelet or equivalent element 31 so that the bight portion of the yoke 20 may be yieldably connected to the levers by means of a pair of helical springs, indicated at 32 and 33.

Between the outer faces of the head members 28 and the adjacent face of the yoke arms 18 and 19 are interposed the brake shoes 34 and 35. These members 34 and 35 are preferably formed of metal, although, if so desired, some other material may be employed, without materially decreasing the efficiency of the device. Each brake shoe is formed in the nature of an elongated bar, the lower terminal of which is reduced or cut-away to form an offset finger or lug as indicated at 35 in Fig. 2. As a result of the formation of the finger 35 upon the lower end of the brake shoe there is produced the lateral shoulder 36, as also shown in Fig. 2. The function of this finger 35 and the shoulder 36 will now be appreciated, for it will be seen in Fig. 2, that the finger is insertible between the arm of the yoke and the opposed face of the opening which is formed in the body member 11, as has been previously explained. The finger member by being thus positioned obviously holds the brake shoe in vertical position and in contact with the adjacent arm of the yoke. The shoulder 36 by engagement with the upper face of the base plate 11 prevents the brake shoe from dropping from its normal position.

Intermediate the length of each brake shoe and on the inner face thereof is formed a notch 37 which receives a transverse pin 38, the terminals of which are secured to the inner faces of the plate members 14 and 15. These pin members form an additional means for holding the brake shoe against displacement.

A metallic facing, indicated at 39, is provided for each brake shoe, and a similar U-shaped facing, indicated at 40, is provided for the channel of each guide member 12 and 13, as shown particularly in Fig. 4.

Having thus described the actual construction and arrangement of the several parts of my invention, I will now explain the manner in which these various parts cooperate to frictionally retard the expansion of the spring. When the vehicle spring is in its normal position, as in Fig. 1, the helical springs 32 and 33 pull with very little force on the levers 26 and 27. It is obvious, therefore, that when the spring of the vehicle is compressed to move the upper and lower elements 21 and 41 toward each other little or no resistance will be offered to the arms 18 and 19 of the brake yoke as they move through the channels of the guide members 12 and 13. When the spring re-acts, however, causing the separation of the members 21 and 41, the terminals of the levers 26 and 27 are pulled up by the springs 32 and 33.

The pull exerted on the arms of the levers by the springs 32 and 33 acts, of course, to swing the upper terminals of the heads 28 into engagement with the brake shoes 34 and 35 causing these brake shoes to frictionally engage the arms 18 and 19 of the brake yoke, forcing these members into severe contact with the walls of the channeled guides 12 and 13. It will be obvious that the braking action will be increased as long as the brake yoke and body member 10 continues to separate. In other words, I have so designed the elements of my shock absorber that the pressure exerted upon the brake shoe and consequently the amount of frictional resistance offered to the separation of the body member and brake yoke will vary in accordance with the severity of the shock sustained by the springs or the vehicle.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desirable to emphasize the fact that various minor changes in details of construction, proportion and arrangement of parts may be resorted to, when required without sacrificing any of the advantages of this invention, as defined in the appended claims.

What I claim is:—

1. The combination with relatively movable vehicle parts, of a shock absorber including a body member rigidly attached to a vehicle part and having channeled guide-ways, a brake yoke pivotally attached to a vehicle part and having its arms mounted for sliding movement through the channels of the body member, means carried by the body member and operatively connected to the brake yoke for automatically offering a frictional resistance to the separation of the yoke and body member.

2. A shock absorber including a body member having channeled guideways, a U-shaped brake yoke having its arms mounted for sliding movement in the channels of the body member, brake shoes carried by the body member, and a pair of levers pivoted in the body member and yieldably connected to the yoke for automatically applying the brake shoes to the arms of the yoke upon the separation of the yoke and body member.

3. A shock absorber of the character described adapted for attachment to relatively movable vehicle parts and including a body member rigidly secured to one of the parts, a brake yoke mounted for reciprocation in the body member, brake shoes carried by the body member and engageable against the yoke, and yieldable means connecting the brake shoes and yoke, whereby the shoes automatically engage the yoke upon the separation of the yoke and body member.

4. The combination with relatively movable vehicle parts, of a shock absorber including a body member rigidly secured to one of the vehicle parts and having channeled guideways, a substantially U-shaped brake yoke having its arms mounted for sliding movement through the guide-ways of the body member, an attaching block pivotally connected to the bight portion of the brake yoke and rigidly secured to the other said vehicle parts, a pair of brake shoes removably positioned adjacent the inner faces of the yoke arms, a pair of levers pivoted in the body member, and yieldable means operatively connecting the levers with the brake yoke, whereby the levers will be automatically swung to urge the brake shoes into engagement with the yoke arms upon the separation of the yoke and body member.

5. The combination with relatively movable vehicle parts, of a shock absorber including a body member rigidly secured to one of the parts and having channeled guide-ways, a brake yoke pivotally connected to the other vehicle part and having its arms mounted for reciprocation through the guide-ways of the body member, brake shoes removably seated in the body member and arranged to bear against the yoke arms, brake levers pivotally mounted in the body member, and yieldable means connecting the levers to the brake yoke, whereby the levers will be automatically swung to urge the brake shoes into engagement with the yoke arms upon the separation of the vehicle parts.

6. The combination with relatively movable vehicle parts, of a body member rigidly secured to one of the parts, said body member including a base plate, channeled guide-ways rising vertically therefrom and in parallel spaced relation to each other, transversely extending parallel spaced plates connecting the guide-ways, a substantially U-shaped brake yoke having its arms mounted for reciprocation through the guide-ways, brake shoes removably fitted between the plates, and a pair of brake levers pivoted between the plates and arranged to engage the brake shoes when swung pivotally for forcing the brake shoes into engagement with the yoke arms, and yieldable means operatively connecting the levers to the bight portion of the brake yoke, whereby the separation of the brake yoke and body member will automatically swing the levers upwardly.

7. The combination with relatively movable vehicle parts, of co-acting shock absorbing parts, the first of said shock absorbing parts being substantially U-shaped and being pivotally connected to the first vehicle part, the second of said shock absorbing parts being rigidly connected to the second vehicle part and having channels receiving the side portions of the first shock absorbing part, and means automatically engageable with the side portions of the first shock absorbing part upon the separation of the shock absorbing parts for resisting the movement of the same.

8. The combination with relatively movable vehicle parts, of co-acting shock absorbing parts, a brake shoe engageable with the first of said shock absorbing parts, a lever pivoted in the second of said shock absorbing parts, and yieldable means connecting the lever to the first of said shock absorbing parts, whereby the brake shoe is moved into engagement with the first of said shock absorbing parts upon the separation of the shock absorbing parts.

9. The combination with relatively movable vehicle parts, of co-acting shock absorbing parts, the first of said parts being substantially U-shaped and being pivotally connected to the first of said vehicle parts, channels formed in the second shock absorbing part to receive the side portions of the said U-shaped member, brake shoes carried by the second shock absorbing part, and levers yieldably connected to the first of said shock absorbing parts for automatically moving the brake shoes into engagement with the said side portions upon the separation of said shock absorbing parts.

In testimony whereof I affix my signature in presence of two witnesses.

ERNEST L. WILLIAMS. [L. S.]

Witnesses:
George C. Dawe,
Franklin W. Dooley.